(No Model.) 4 Sheets—Sheet 2.

J. W. WALLIS.
TRICYCLE COTTON PICKER.

No. 422,671. Patented Mar. 4, 1890.

WITNESSES:
George Binkenburg
C. Sedgwick

INVENTOR:
J. W. Wallis
BY Munn & Co.
ATTORNEYS.

(No Model.) 4 Sheets—Sheet 3.
J. W. WALLIS.
TRICYCLE COTTON PICKER.
No. 422,671. Patented Mar. 4, 1890.
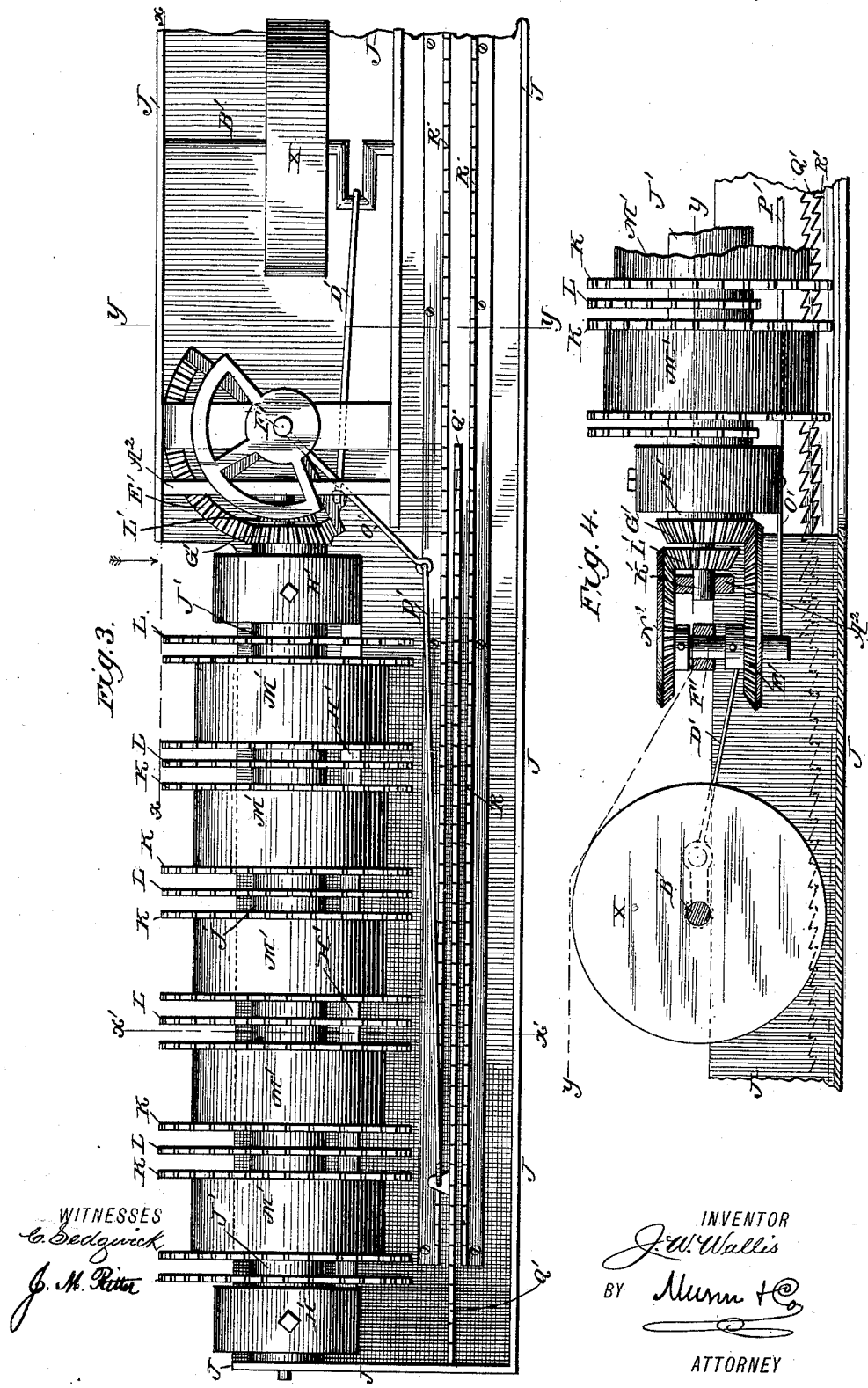

(No Model.) 4 Sheets—Sheet 4.

J. W. WALLIS.
TRICYCLE COTTON PICKER.

No. 422,671. Patented Mar. 4, 1890.

WITNESSES:
C. Sedgwick
J. M. Ritter

INVENTOR
J. W. Wallis
BY Munn & Co.
ATTORNEY

UNITED STATES PATENT OFFICE.

JAMES W. WALLIS, OF BIRMINGHAM, ALABAMA.

TRICYCLE COTTON-PICKER.

SPECIFICATION forming part of Letters Patent No. 422,671, dated March 4, 1890.

Application filed October 31, 1887. Serial No. 253,849. (No model.)

*To all whom it may concern:*

Be it known that I, JAMES W. WALLIS, of Birmingham, in the county of Jefferson and State of Alabama, have invented a new and Improved Cotton-Harvester, of which the following is a full, clear, and exact description.

This cotton-harvester is mounted on wheels, preferably three in number, and adapted to be pushed and operated by hand-power. The construction of the same is as hereinafter described.

Figure 1:
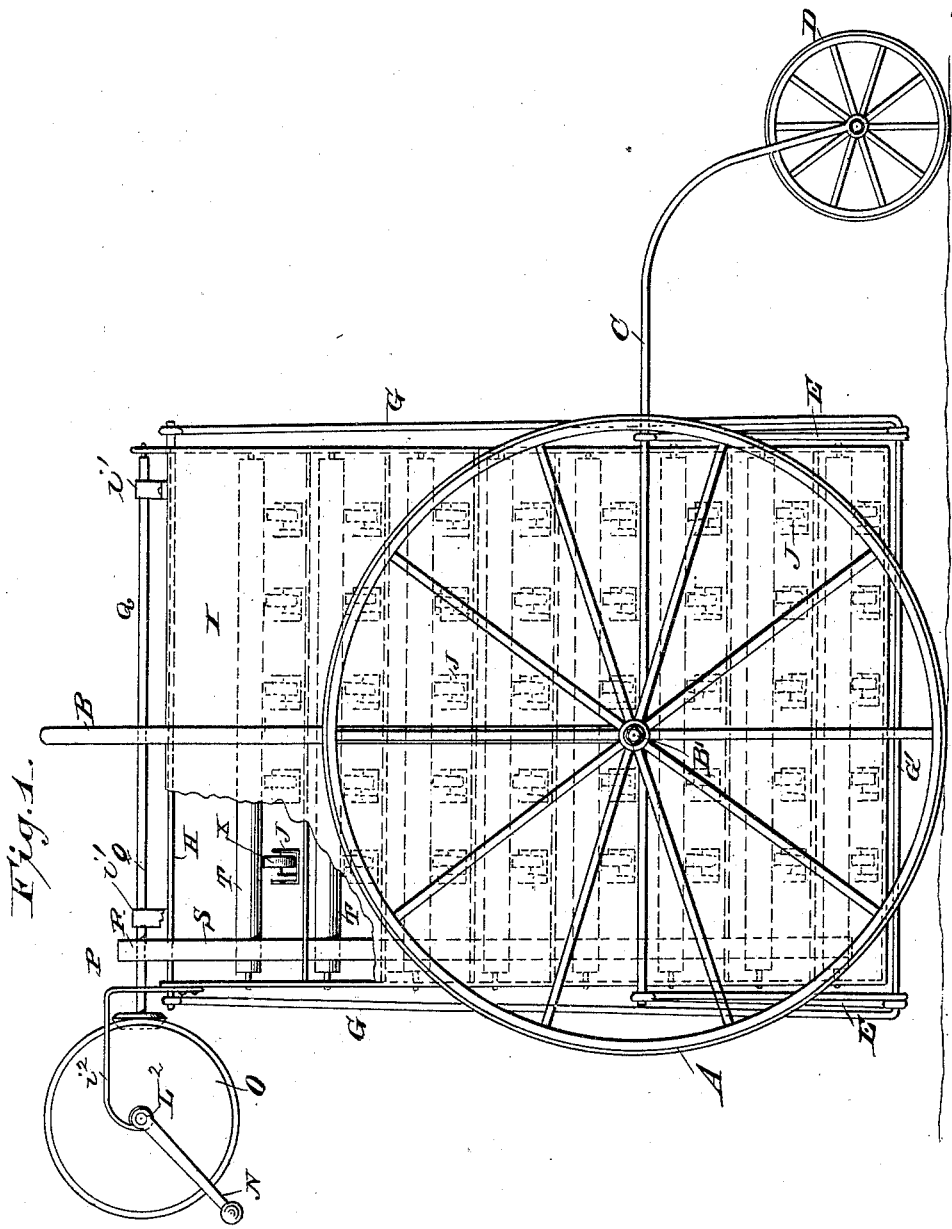
Figure 2:
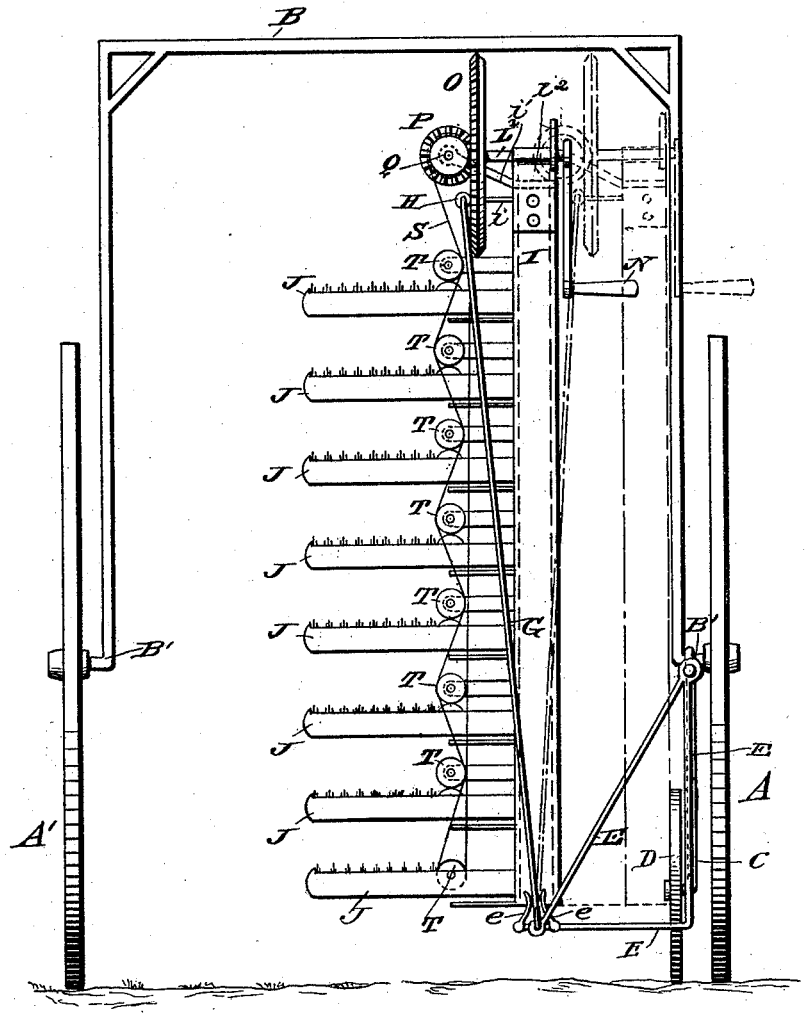
Figure 6:
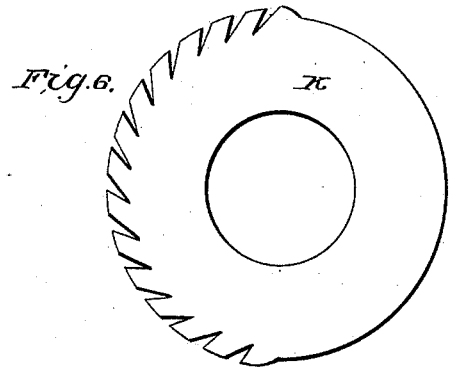
Figure 5:
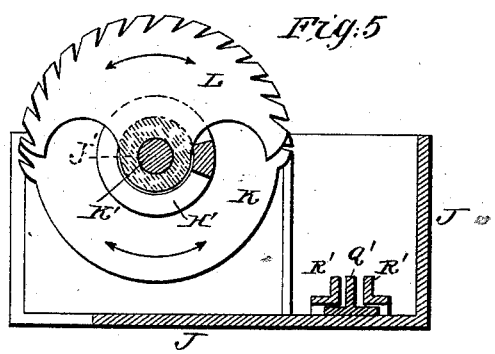
Figure 7:
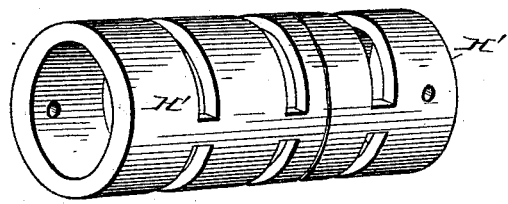
Figure 8:
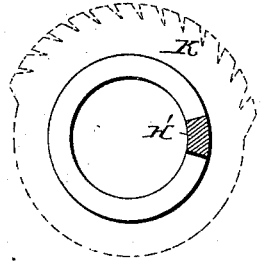

In the accompanying drawings, (four sheets,) Figure 1 is a side view of the machine, part being broken away. Fig. 2 is a rear elevation, only half of the picking mechanism being shown. Fig. 3 is an enlarged plan view of the pickers and mechanism for operating them directly, together with the arm carrying the same. Fig. 4 is a vertical longitudinal section on line $x$ $x$, Fig. 3. Fig. 5 is a vertical cross-section on line $x'$ $x'$, Fig. 3. Fig. 6 is a side view of one of the circular toothed plates which perform the picking. Fig. 7 is a perspective view of the hollow shaft on which the circular toothed plates are mounted. Fig. 8 is a cross-section of the shaft shown in Fig. 7.

The rigid frame of the machine consists of a bent or U-shaped iron axle B and an iron rod C, and it is supported by two large wheels A A' and a small front wheel D. The axle B is arranged vertically and its ends bent outward horizontally to form the journals B' B' of said wheels A A'. The rod C is placed horizontally at right angles to the axle B, parallel to the wheels A A', and rigidly secured to the right-hand axle-journal. Its forwardly-extended portion is curved downward, and the small wheel D is journaled thereon, as shown.

The local relation of the wheels A A' D and frame B C, as above described, is suggestive of the arrangement of the corresponding parts of a certain form of tricycle, and hence I propose for convenience of designation to term this the "tricycle" cotton-harvester.

The machine is propelled and guided along the row of cotton-plants by one or more laborers who walk behind it, their hands grasping the top horizontal portion of the axle B, against which they push with the requisite degree of force. At the same time one of the laborers (if there are more than one) rotates the shaft $L^2$ by means of its handle N, and thereby operates the pickers, which, together with the means for directly operating them, I will presently describe.

The letter I indicates a narrow box, which serves as a temporary receptacle for the cotton picked from the bolls. To this box all the arms J J, that support the pickers, and some of the means for operating them are attached. The said box I swings free from a horizontal bar H, Figs. 1 and 2, which is supported, Fig. 1, in the upper ends of a bail-like hinged frame G G G', formed of an iron rod—that is to say, the box I is connected with bar H by rigid arms $i$, Fig. 2, and swings between the parallel portions G G of said frame, the horizontal base portion G' of the latter being journaled in triangular iron frames E, which are rigidly attached to the rod C, constituting part of the frame of the machine and arranged one in front and one in rear of the axle. As shown in Fig. 2, the supports E E are provided at their lower inner corners with eyes that serve as the bearings of the tilting frame G G G', and curved arms $e$ are also attached to the frames E at the same point, for the purpose of limiting the to-and-fro movement of frame G G G'.

When the machine is in use, the operator swings the box I and its attached pickers laterally, as hereinafter more fully described.

The circular plates K, toothed on one side, and segmental toothed plates L, constituting the pickers, are mounted on shafts and operated by mechanism carried by the box-like arms J. These latter are arranged in rows one above another. Near the inner end of each arm J (see Figs. 3 and 4) is a transverse crank-shaft B', on which is mounted a disk X, that serves as an intermediary for transmitting motion to the pickers from the rollers T, (see Figs. 1 and 2,) arranged at right angles to the arms J and journaled in rigid arms, Fig. 2, attached to the side of box I. These long rollers T work in frictional contact with the disks X, and with a flat belt S, which passes over the pulley R on shaft Q at the top of box I and around a roller T at the bottom of the same. The said shaft Q is supported and journaled in arms $i'$, projecting laterally from the box I. The crank-shaft $L^2$ is similarly supported and journaled in an arm $i^2$, attached to the box I.

The crank-arm of shaft B' is connected by pitman D' with a segmental gear E', placed in a horizontal position with its toothed side up and secured on a vertical shaft F', mounted in suitable bearings in the arm J. The segmental gear E' meshes with a bevel gear-wheel G', secured on a hollow shaft H', (shown detached in Fig. 7, Sheet 4,) and carrying a number of plates K, which are held a suitable distance apart by intervening washers M'. These plates K are provided on one side with teeth which incline in one direction in the plane of the plates for the purpose of enabling them to take hold of the cotton when moving in one direction and release it when the motion is reversed.

The hollow shaft H' has a series of wide transverse slots, which afford space for the segmental plates L, which are toothed in the same manner as the circular plates K. These segmental plates L are mounted on a shaft K', which extends axially through the said shaft H', the latter being supported on the former, but free to rotate around it. The said shaft K' has its bearings in a cross-bar $A^2$ and in the outer end of the arm J.

The plates L project transversely to their shaft in the slots of shaft H', and are held the requisite distance apart by means of cylindrical washers J'. On the inner end of shaft K' is fixed a bevel gear-wheel L', which meshes with a segmental gear N', secured, like gear E' on the shaft F', but having its toothed side downward, so that when the said shaft is rocked the gears E' and N' impart oscillating motion to the wheels G' and L', and thereby to the shafts H' and K' in opposite directions, and the toothed plates K receive like motion.

On the shaft F' is secured an arm O', to which is jointed a pitman P'. The latter is in turn loosely connected with a straight narrow toothed blade Q', which is arranged between and parallel with the similar blades R' R', Fig. 3, fixed on the bottom of arm J. The toothed edges of these blades are uppermost, and the blade Q' slides or reciprocates, while the others R' R' are fixed in position.

The teeth of plates K L, and also of the blade Q', take hold of the cotton fibers when moving in the direction of their inclination or projection, but not when moving in the reverse direction or backward, as before stated.

The general operation is as follows: The machine being pushed along a row of cotton-plants, the operator seizes the handle N of crank-shaft $L^2$, and by pushing or pulling laterally tilts the frame G G G', so that the box I, with its attachments, is swung back and forth at right angles to the direction of motion of the machine, thus carrying the arms J and the pickers K L alternately into and out of the cotton-plants. The limits of movement of the box I and attachments are indicated by the two positions, in which the same are shown in full lines and dotted lines, Fig. 2. At the same time that the above-described lateral movement is effected the operator rotates the crank-shaft $L^2$, which, through its gear O, rotates the shaft Q, thus causing the belt S to impart like motion to the rollers T, and they in turn to the disks X, so that the arm of crank-shaft B oscillates the segmental gears E' and N', which in turn transmit such motion to gear-wheel, G' and L', respectively, but in opposite directions, so that the shafts H' K' and their toothed pickers K and L have a reciprocating rotary motion in opposite directions. The peripheries of the pickers K L are in line with each other, and as they pass over the cotton-plants the teeth take hold of the cotton and extract it from the bolls and carry it along with them. In the reverse movement of the pickers K L their teeth slip out of the cotton, which is carried on by such of the pickers as are moving at that instant in the direction of the inclination of the teeth. Thus the cotton is carried back of the pickers K L and delivered into the space at the bottom of which are the toothed blades Q' R'. The blade Q' is constantly reciprocating and carries the cotton with it, while the fixed blades R' prevent the cotton from moving backward, (with the blade Q'.) Thus the cotton is carried along and delivered into the hollow box I, whence it may be removed to another receptacle by suitable means, (not necessary to describe.)

What I claim is—

1. In a cotton-harvester, the combination of the bent or U-shaped axle and wheels mounted thereon, the rod C, attached to said axle at right angles and having the wheel D mounted on its forwardly-extended portion, the dependent triangular frames E, secured to rod C, the tilting frame G H, hinged at its lower end to said frames E, the cotton-receptacle I, pendent from the tilting frame, a series of arms J, projecting from said receptacle and pickers attached to them, and means for operating the said pickers, substantially as shown and described.

2. In a cotton-harvester, the combination, with the main wheels and a U-shaped axle, on which said wheels are mounted, of a horizontal rod secured to said axle and carrying at its downwardly-bent forward end a guide-wheel, triangular frames rigidly secured on said horizontal rod, the tilting bail-like frame G G G', journaled at its lower end in said frames, a cotton-receptacle suspended from the upper part of said frame and carrying pickers, a shaft mounted on said receptacle and receiving a rotary motion, and an endless belt set in motion by said shaft, the horizontal rollers T, friction-disks X, and pickers operated by suitable connection with the latter, substantially as shown and described.

3. In a cotton-harvester, the combination, with the U-shaped vertical axle and rod C, supported on wheels, of a cotton-receptacle, which is pendent from supports that swing beneath the axle in a plane parallel to it, a series of arms J, attached to said receptacle and carrying pickers, a hand-crank shaft supported on said receptacle in a position which adapts it to be operated by the person who pushes the machine, the pickers and gearing intermediate of the latter, and the crank-shaft for operating the pickers, as specified.

JAMES W. WALLIS.

Witnesses:
BENJ. COTTRILL,
GEO. D. STATON.